(12) United States Patent
Nogueira Dias Da Silva

(10) Patent No.: US 9,664,170 B2
(45) Date of Patent: *May 30, 2017

(54) HYDROELECTRIC GENERATOR

(71) Applicant: Hernani Jose Nogueira Dias Da Silva, Felgueiras (PT)

(72) Inventor: Hernani Jose Nogueira Dias Da Silva, Felgueiras (PT)

(*) Notice: Subject to any disclaimer, the term of this patent is extended or adjusted under 35 U.S.C. 154(b) by 383 days.

This patent is subject to a terminal disclaimer.

(21) Appl. No.: 14/450,567

(22) Filed: Aug. 4, 2014

(65) Prior Publication Data

US 2015/0021920 A1    Jan. 22, 2015

Related U.S. Application Data

(63) Continuation of application No. 13/519,757, filed as application No. PCT/IB2010/001565 on Jun. 28, 2012, now Pat. No. 8,796,876.

(30) Foreign Application Priority Data

Dec. 28, 2009 (PT) .......................... 104908

(51) Int. Cl.
*F03B 11/08* (2006.01)
*F03B 13/10* (2006.01)
(Continued)

(52) U.S. Cl.
CPC ............. *F03B 13/10* (2013.01); *F03B 3/183* (2013.01); *F03B 11/08* (2013.01); *F03B 15/14* (2013.01);
(Continued)

(58) Field of Classification Search
CPC .......... F03B 3/121; F03B 3/183; F03B 7/003; F03B 11/008; F03B 11/08; F03B 17/062;
(Continued)

(56) References Cited

U.S. PATENT DOCUMENTS 988,033 A * 3/1911 Rowley ................... F03B 11/08
210/156
4,301,377 A * 11/1981 Rydz ..................... F03B 17/063
290/43
(Continued)

FOREIGN PATENT DOCUMENTS

GB     2223063      3/1990
WO  2007/126232   11/2007

*Primary Examiner* — Ninh H Nguyen
(74) *Attorney, Agent, or Firm* — Scott Houtteman; Kile Park Reed & Houtteman PLLC

(57) ABSTRACT

This invention is made of a rotational hollow blade (11) turbine, which can be installed in watercourses for power generation. This system may include up to six propellers placed in hexagon shape, since this is the recommended shape for a better collection of the river flow, so that their movement does not obstruct the turbine rotation, and increases speed when immersing and emerging. The mentioned propellers are assembled on top of an axis of rotation, and the latter has an emission pinion (12) on both ends, which connects to a receiver pinion (13) placed inside a reduction gear box. Several turbines can be installed depending on the motive power of each hydric flow, and on the connection to two flow generators, one on each side, so that the power falling upon the turbine is regular and balanced.

4 Claims, 3 Drawing Sheets

(51) Int. Cl.
*F03B 3/18* (2006.01)
*F03B 15/14* (2006.01)
*F03B 17/06* (2006.01)

(52) U.S. Cl.
CPC .......... *F03B 17/061* (2013.01); *F03B 17/062* (2013.01); *F03B 17/063* (2013.01); *Y02E 10/226* (2013.01); *Y02E 10/28* (2013.01); *Y02E 10/38* (2013.01)

(58) Field of Classification Search
CPC .......... F03B 17/63; F03B 15/14; F03B 15/14; Y02E 10/226
See application file for complete search history.

(56) References Cited

U.S. PATENT DOCUMENTS

| | | | | |
|---|---|---|---|---|
| 4,843,249 | A * | 6/1989 | Bussiere | F03B 13/183 290/42 |
| 5,009,568 | A * | 4/1991 | Bell | F03B 13/145 290/53 |
| 5,834,853 | A * | 11/1998 | Ruiz | E02B 9/08 290/42 |
| 2009/0322093 | A1 * | 12/2009 | Winius | F03B 17/063 290/54 |

* cited by examiner

HYDROELECTRIC GENERATOR

This application is a continuation of Ser. No. 13/519,757, filed Jun. 28, 2012, now U.S. Pat. No. 8,796,876 which is the U.S. national phase of Ser. No. PCT/IB2010/001565.

FIELD OF THE INVENTION

This invention consists of a hydro generator and in particular but not exclusively describes a hydro generator whose installation and operation does not cause any environmental impact in the surrounding area.

STATE OF THE ART

Power made from running water has been explored since many years. However, traditional approaches imply disadvantages due to environmental factors such as:

overflow of the river banks that otherwise would be available to be used; landscape modification; loss for the local community that could live and work in the land close to the river; modification of river characteristics obstructing fish free flow;

river deviation widely affecting nature in neighbouring rural areas;

total or partial permanent river blockage for power generation is unfavourably affected by flow variation.

Thus, one of the objectives of this invention also encompasses the proposal of a hydro generating device which does not include the above mentioned disadvantages.

In order to resolve all the above described inconveniences, this invention advances a new concept of hydric generators, namely, the development of a device whose installation and operation do not imply environmental damage whatsoever.

OBJECTIVE OF THE INVENTION

The objective of this invention is that of developing a hydro generator capable of resolving all the above mentioned inconveniences, namely enabling that the environment is not damaged. It is also the objective of this invention the development of a versatile hydro generator capable of operating regardless of the local characteristics. Furthermore, it is also the objective of this invention the development of a power generating device easy to assemble and inexpensive to produce.

DESCRIPTION

This invention consists mainly of a rotational hollow blade turbine which can be installed in watercourses for power generation. This system may include up to six propellers placed in hexagon shape, since this is the recommended shape for a better collection of the river stream strength, so that their movement does not obstruct the turbine rotation, and increases speed when immersing and emerging. The mentioned propellers are assembled on top of an axis of rotation, and the latter has an emission pinion on both ends, which connects to a receiver pinion placed inside a reduction gear box. Several turbines can be installed depending on the motive power of each hydric flow, and on the connection to two flow generators, one on each side, so that the power falling upon the turbine is regular and balanced.

BRIEF DESCRIPTION OF THE DRAWINGS

Prior to describing the invention in detail, a short description of all figures is herein supplied.

In FIG. 1 the hydrogenerator structures are displayed, where:

(1) corresponds to the power transformer;
(2) indicates the stream direction;
(3) corresponds to electrical wire;
(4) and (5) concern respectively generator 1 and 2;
(6) and (7) concern respectively receiver and emission pinion;
(8) corresponds to generator supporting device;
(9) corresponds to transmission shaft (propeller-generator);
(10) corresponds to the supporting structure to the hydro generator shaft;
(11) corresponds to the turbine
(12) and (13) concern respectively receiver and emission pinion;
(14) corresponds to the transmission shaft supporting device;
(15) corresponds to the concrete platform;
(16) corresponds to the structure-platform connection.

Figure 1:
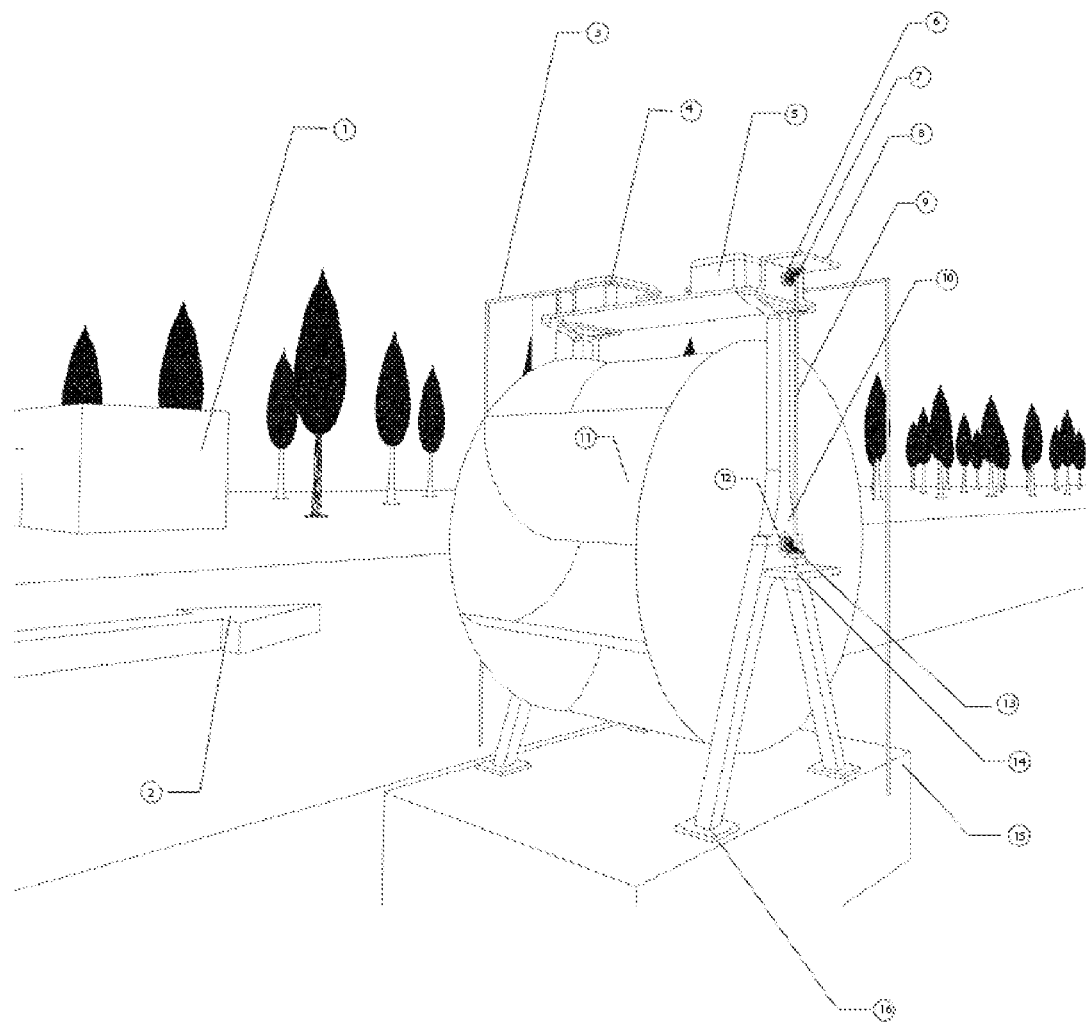
FIGS. 1-3 show structures representing the object of this invention.
Figure 2:
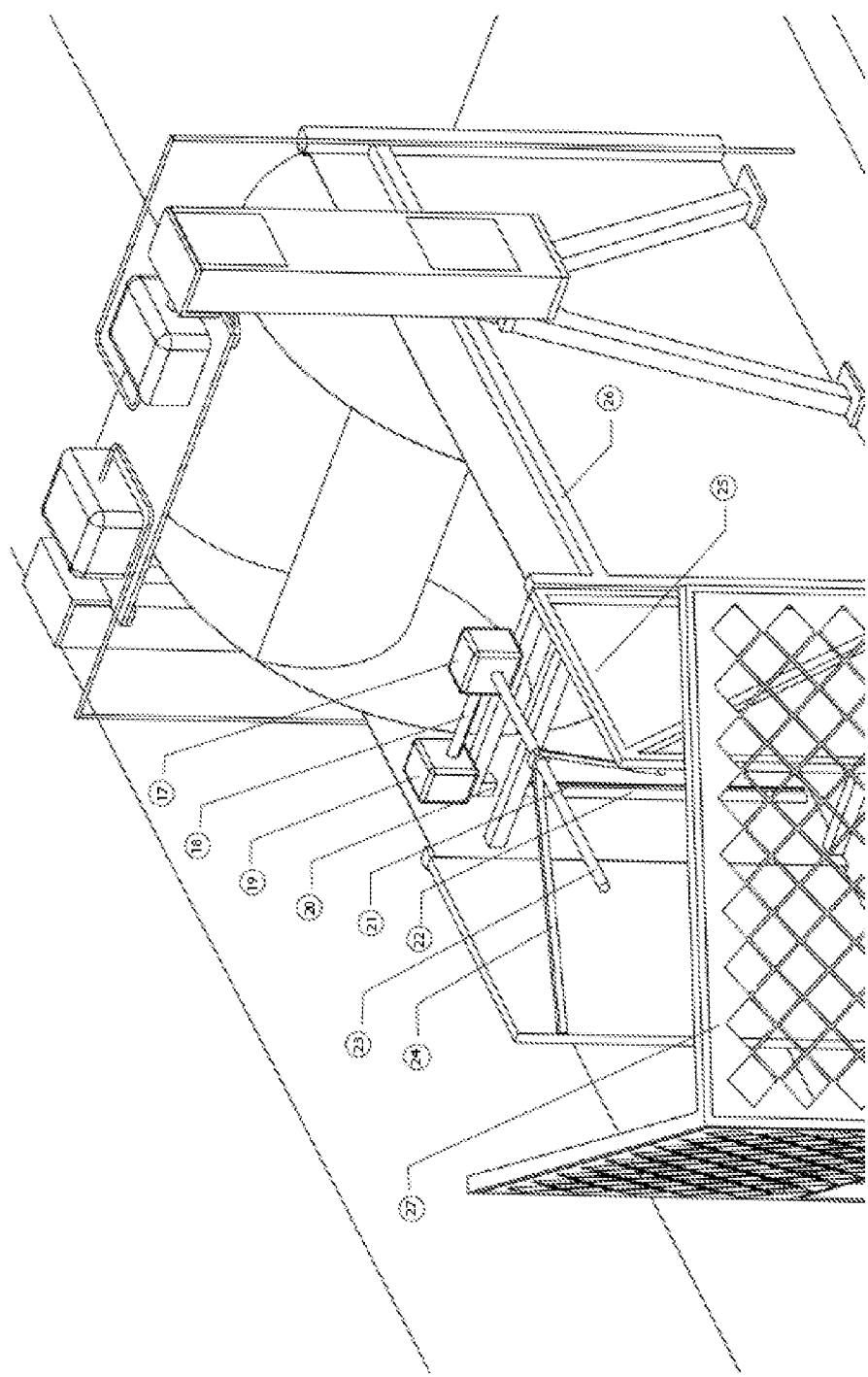

In FIG. 2, the hydro generator auxiliary structures are displayed:

(17) gate opening/closing engine;
(18) gate opening/closing transmission shaft;
(19) water level regulator;
(20) level check control box;
(21) water level check buoy;
(22) buoy supporting device;
(23) transmission shaft of gate engine;
(24) arms for gate opening;
(25) mobile gates for water level regulation;
(26) structure of the water level regulating system;
(27) protection net.

DETAILED DESCRIPTION

This invention consists of a device to use water motive power (2), for electrical power generation, made of a supporting steel (10) developed upon (16) one concrete structure (15), and fixed between both by a one-shaft rotational roller (14), which in turn is connected to a hollow blade turbine (11), which in turn is connected to a half angle plate transmission cogwheel (12), to a half angle plate admission cogwheel (13) containing half the cogs, connected to a rotational shaft (9), which has a half angle plate cogwheel (7) with twice as much cogs of the cogwheel (6), which in turn fits in a half angle plate admission cogwheel (6) with half of the wheel cogs (7), in twofold by a transmission shaft to a rotation gearbox (5 and 4) which is hold by the supporting bar (8), connected to a transmission shaft, which in turn is connected to a device (5 and 4) converting the shaft rotation into power, and for a better development of the generated power directs it through a device (3) which transforms the power received (1). The system which is herein represented for the generator (5) is simultaneously applied to generator (4). One should keep in mind that the device contains two simultaneous generators, which allows doubling the power generated.

Figure 3:
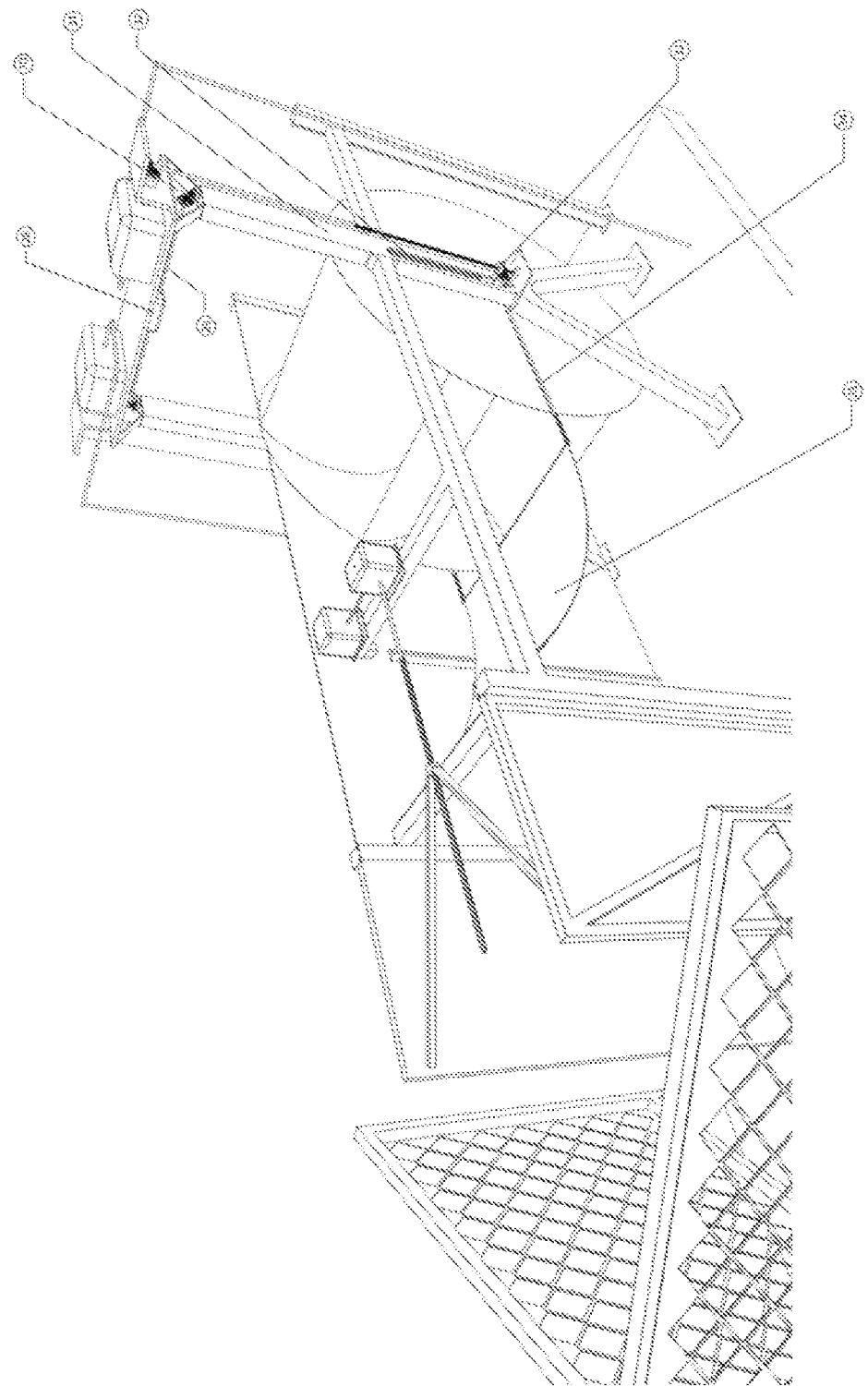

Adjacently, there is a system which monitors the rise and lowering of the river bed stream by means of two mobile gates (25). Depending on the flow of the river stream, gate opening and closing (25) is controlled by two arms (24) connected to the rotational shaft (23). This shaft (23) is connected to an engine (17) which in turn is connected to a monitoring engine (19), by a shaft (18). The engine (19) is connected to the water level check system (20), which is linked to a buoy supporting device (22). The buoy (21) transmits the rise and the lowering of water levels to the control check box (20) thus accurately monitoring the height of the river bed. Upstream there is a squared protection net (27) avoiding eventual flow of big objects and thus fully protecting the turbine. As shown in FIG. 3, this invention is also equipped with a variable stream system enabling the turbine rise and lowering, complemented with a turbine rise regulating engine (28), engine transmission shaft to the rise shaft (29), transmission between the engine shaft and the rise shaft (30), structure with fissure of the rise system (31) from which the turbine regulation movement is made, shaft for the turbine rise movement (32), support to the turbine rise system (33), supporting arm for the plate rise (34), control plate for the hydric flow level (35).

These hydro generators can be installed in line and side by side one to the other, with no need for significant distances between them, or if convenient they can be linked by gates (just like channels), eventually avoiding in most cases dam construction, favouring the use of hydric streams enabling still the installation under bridges, in river aqueduct falls as well as in channels. This equipment has proven to be profitable due to its permanent operation, unlike other renewable energy sources. Its manufacturing and assembly is simple, low cost and environment-friendly. Rivers can still be navigated after the installation of this equipment.

The operation of the hydro generator described does not have any impact in water pollution. On the contrary, water movement caused by the rotational blades enables water purification, vaporization and oxygenation processes, which are important for our Planet. This power generation system includes one mechanism linked to the hydro generator originating the river flow height balancing, thus not damaging the natural river ecosystem. Another characteristic of the system is the regulation of the river bed level control made by the opening and closing of two parallel gates. Such gates aim to keep the same water level up to the turbine axis, so that a regular inertia and motive power is projected upon them. The system also comprehends gate closing for machine stoppage and protection in case of flood, and a protection net to avoid any object to damage the turbine operation. Since there is the possibility that some river bed heights may vary significantly form place to place, where the gates themselves cannot control the regulation system of water flow into the turbine, a technology based on a stream regulation platform has been designed, enabling the turbine to be constantly operating, both in movement and in projected maximum height.

The invention claimed is:
1. A hydro generator useful for converting water flow in a stream into electrical power, comprising:
   a turbine of concave paddles,
   a rotational transmission system, and
   an electric generator system,
said turbine of concave paddles further comprising:
   a central axis around which said concave paddles of the turbine are mounted symmetrically about herself, which rotates,
   said axis having concave paddles mounted evenly spaced and distributed and extending out from said axis;
said rotational transmission system further comprising:
   one or more rotational shafts configured to mechanically transmit turbine of concave paddles rotation to rotation of a transmission shaft; and
said electric generator system further comprising:
   said transmission shaft and an electric generator wherein said transmission shaft rotation causes said electric generator to generate electric power;
wherein said movement of water flow is converted into electric power by said hydro generator and further comprising:
   two mobile gates which open in response to lowering of the stream water level and close in response to the rising and the stream water level, that when applied to the water current.
2. The hydro generator as defined in claim 1, further comprising:
   said mobile gates opening and closing is controlled by two arms connected to a rotational shaft which in turn is connected to a water level check system which monitors the height of the stream and closes the gates when the water level rises and opens the gates when the water level falls.
3. The hydro generator as defined in claim 2, further comprising:
   said water level check system is equipped with a sensor in contact with the water surface such that the turbine rises and lowers with the water level and transmits the water level information to a control check box which, in turn operates an engine that opens and closes the mobile gates, this when the turbine of concave paddles are installed are installed into currents.
4. The hydro generator as defined in claim 3, further comprising:
   the water level information is transmitted to the control check box by a mechanical system or a wireless communication system.

* * * * *